(12) United States Patent
Knight et al.

(10) Patent No.: US 6,234,407 B1
(45) Date of Patent: May 22, 2001

(54) GROUND ATTITUDE CONTROL MEANS

(75) Inventors: Brian George Knight, Wireless Hill, South Luffenham, Oakham, Rutland, Leicestershire (GB), LE15 8NF; Kenneth Frederick Taylor, Peterborough (GB)

(73) Assignee: Brian George Knight (GB)

( * ) Notice: Subject to any disclaimer, the term of this patent is extended or adjusted under 35 U.S.C. 154(b) by 0 days.

(21) Appl. No.: 09/341,202

(22) PCT Filed: Jan. 12, 1998

(86) PCT No.: PCT/GB98/00101

§ 371 Date: Aug. 18, 1999

§ 102(e) Date: Aug. 18, 1999

(87) PCT Pub. No.: WO98/30088

PCT Pub. Date: Jul. 16, 1998

(30) Foreign Application Priority Data

Jan. 13, 1997 (GB) .................................................. 9700569

(51) Int. Cl.[7] ...................................................... B05B 1/20
(52) U.S. Cl. ........................... 239/163; 239/166; 239/172
(58) Field of Search .................................... 239/146, 159, 239/163, 164, 166, 172

(56) References Cited

U.S. PATENT DOCUMENTS

| 4,168,800 | * | 9/1979 | Quick | 239/164 |
| 4,643,358 | * | 2/1987 | Jackson | 239/166 |

FOREIGN PATENT DOCUMENTS

| 41 40 254 A1 | 6/1993 | (DE) . |
| 2 654 574 | 5/1991 | (FR) . |
| 2 701 774 A1 | 2/1993 | (FR) . |

\* cited by examiner

*Primary Examiner*—Lisa Ann Douglas
(74) *Attorney, Agent, or Firm*—Townsend and Townsend and Crew LLP

(57) ABSTRACT

A ground attitude control apparatus is provided for maintaining a constant boom attitude when traveling over uneven ground. A boom for supporting crop-spraying equipment is pivotally mounted on and extending either side of a carrier for movement about a substantially horizontal first pivot axis. A levelling member is pivotally mounted on the boom for movement about a substantially horizontal second pivot axis. At least one damper is connected between the levelling member and the boom and exerts a damping effort on the boom. A linkage is pivotally connected to both the levelling member and the carrier. The linkage is disposed to control the damping effort to cause the boom to rotate at a desired angular velocity in response to rotation of the carrier.

8 Claims, 2 Drawing Sheets

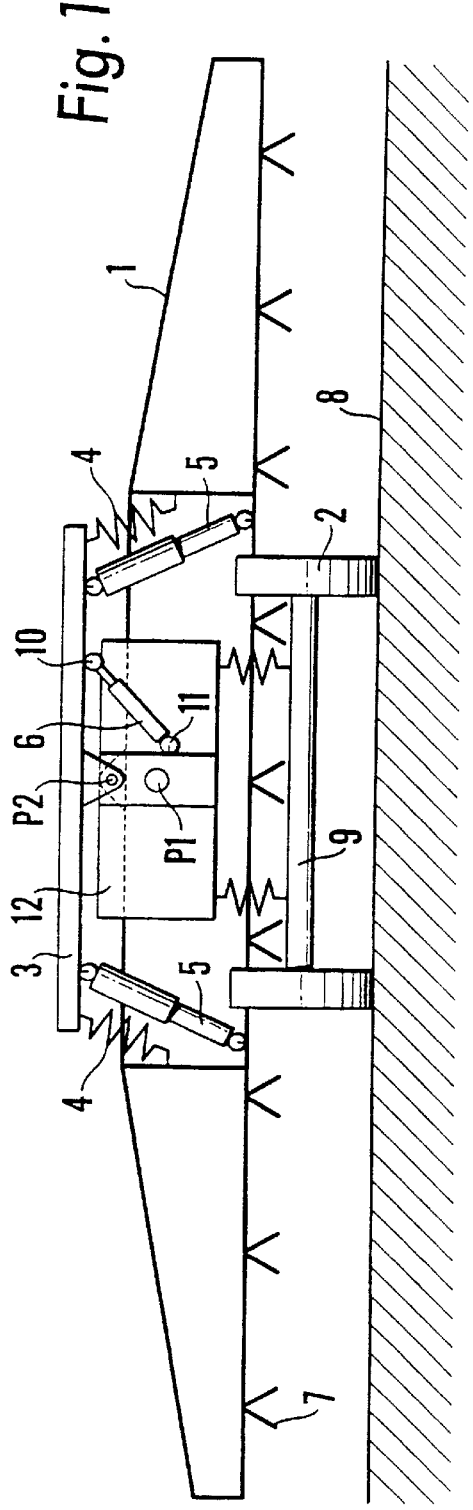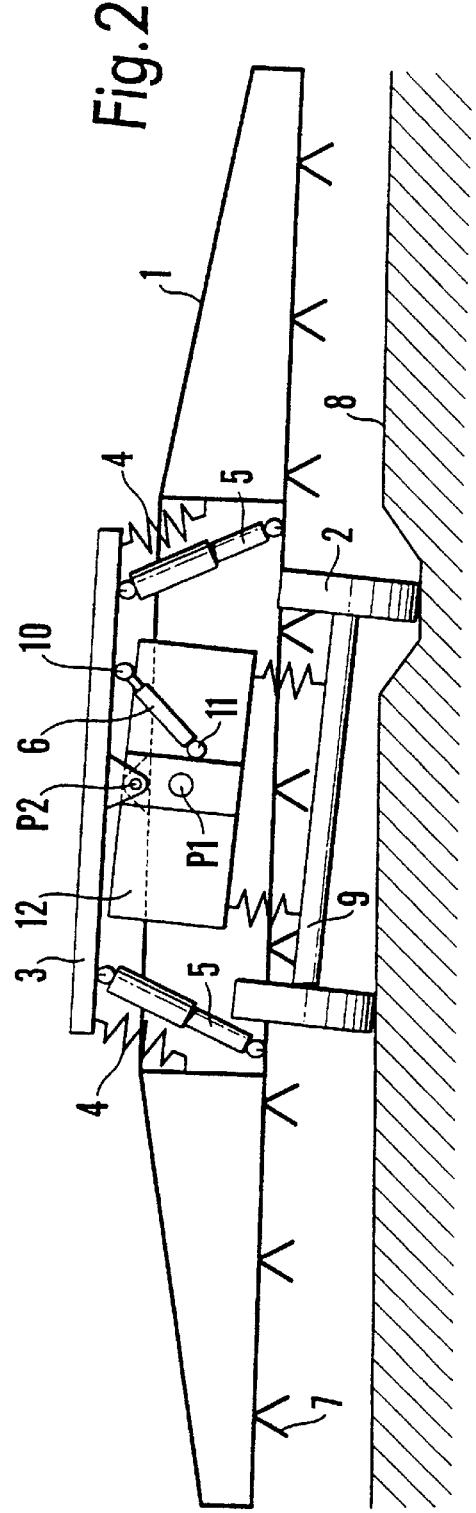

GROUND ATTITUDE CONTROL MEANS

TECHNICAL FIELD

This invention relates to a ground attitude control means more particularly, but not exclusively, for use in agricultural crop-spraying equipment.

BACKGROUND ART

It is common practice to apply chemicals to a growing crop, for instance to help control pests, fungi or weeds.

Ground-based crop-spraying equipment commonly comprises a vehicle-carried body, e.g. a tractor-carried body, having an elongate framework or boom which extends laterally from the body and which supports nozzles which apply a spray mist of chemical/water mixture to the crop and its surroundings. Such a boom is often used to cover working width of between 12 and 30 meters to minimise the number of passes required to cover a given area of land.

The requirement for such an elongate boom causes the designer of crop-spraying equipment many problems in dealing with the stresses imposed on the boom and its supporting framework and on the carrying vehicle. There is also the problem of maintaining a distance between the boom and the ground (or growing crop) whilst the carrying vehicle is travelling over uneven ground.

Prior types of equipment have attempted to resolve the problems using various mechanisms.

Previous designs are known which use a single pivotal connection between a carrying frame supported on the carrying vehicle and the boom which allows the boom to swing in the manner of a pendulum independently of the carrying frame. With this type of design it is possible for conditions to occur which cause the boom to swing uncontrollably and it is common practice to add springs and shock-absorbers between the carrying frame and the boom to afford some degree of control. This has the effect of tending to make the boom attempt to follow the movements of the carrying frame on the one hand and attempt to follow the horizon on the other hand. The resultant compromise angle is not always desirable.

The addition of springs and shock-absorbers is beneficial in that the boom tends to follow the angle of the carrying frame (rather than following the horizon) when operating on a side-incline (or when the vehicle's wheels on one side are in a deeper rut than on the other side) but also causes an unwanted effect when conditions occur which require the boom to be set at an angle differing to that of the carrying frame. This can commonly occur, for example, when the suspension of the carrying vehicle or frame tends to cause the boom to favour the horizontal rather than following the angle of its wheels.

An alternative known method adds a levelling bar to the above pendulum mechanism to allow the neutral pendulum point (that is where the springs on both sides of the pendulum pivot apply an equal force) to be biased to one side or the other. This allows the machine operator (or an automatic mechanism) to reset the correct distance between boom and ground for the duration of the aforesaid conditions. This mechanism commonly takes the form of a rocker bar pivoted on the carrying frame, the springs being attached to this bar rather than to the carrying frame.

The present invention seeks to provide means to enable the boom more closely to follow the contours of the ground by at least partially isolating the boom from the movements of the carrying vehicle.

An object of the invention is to seek better to isolate the boom from movements of the carrying frame while retaining the beneficial effects of the boom tending to follow the angle of the carrying frame and also retaining the ability to bias the neutral pendulum point.

DISCLOSURE OF THE INVENTION

The invention is ground attitude control means to enable a member, e.g. an elongate boom, to maintain a constant attitude with respect to a datum, e.g. the ground, comprising a carrier on which the boom is pivotally mounted for movement about a substantially horizontal axis, a levelling member pivotally mounted on the boom for movement about a substantially horizontal axis and linkage means pivotally connected between the levelling member and the carrier, the pivotal connections being disposed to cause the boom to rotate at a lower or higher angular velocity than the carrier in response to rotation of the carrier.

Preferably one or more springs and/or shock absorbers or dampers will be connected between the boom and the levelling member.

The linkage may be in the form of a length adjustable member, e.g. an hydraulic cylinder.

The position at which the linkage is pivoted on the carrier may be adjustable longitudinally of the boom to vary the effect of the control means.

The member to be attitude controlled may be an agricultural spray boom having spray nozzles. Thus in one aspect the present invention provides an agricultural implement having an elongate boom supporting spray nozzles for applying chemicals to a soil surface or growing crop the attitude of the spray boom being controlled by control means as described above.

The pivoting of the levelling member on the boom rather than on the carrying frame, and suitably positioning he levelling member/carrier linkage, results in the production of the desired advantageous geometrical effect. The effect may be enhanced by attaching the shock absorbers between the levelling member and the boom rather than between the carrier and the boom as is conventional. Thus by suitably adjusting the position of the linkage between levelling member and the carrier, the damping effort of the shock absorbers can be altered without changing the shock absorbers themselves.

As the carrier rotates due to rocking of the vehicle, the boom tends to maintain its rotational position due to its own inertia, the shock absorbers and springs (and the fact that the levelling member is pivotally attached to the boom) tend to cause the levelling member to copy the rotational position of the boom but the levelling member is linked to the carrier and so is forced to rotate or contra-rotate relative to the carrier. Thus the springs and shock absorbers cause the boom to rotate or contra-rotate relative to the carrier which tends to neutralise or enhance the effect on the boom of the initial rotational movement of the carrier.

The overall effect is that the boom is caused to rotate at an angular velocity which may be lower or higher or the same as the carrier. By varying the geometrical relationship between the position of the pivots and the angle of the levelling member/carrier linkage it is possible to change the ratio of this effect.

BRIEF DESCRIPTION OF DRAWINGS

The invention is diagrammatically illustrated by way of example in the accompanying drawings, in which:

FIG. 1 is a diagram showing an agricultural sprayer vehicle carrying a spraying boom on level ground and incorporating ground attitude control means according to the present invention;

FIG. 2 is a diagram showing the sprayer of FIG. 1 on uneven ground and showing that the boom remains level.

BEST MODE FOR CARRYING OUT THE INVENTION

Figure 3:
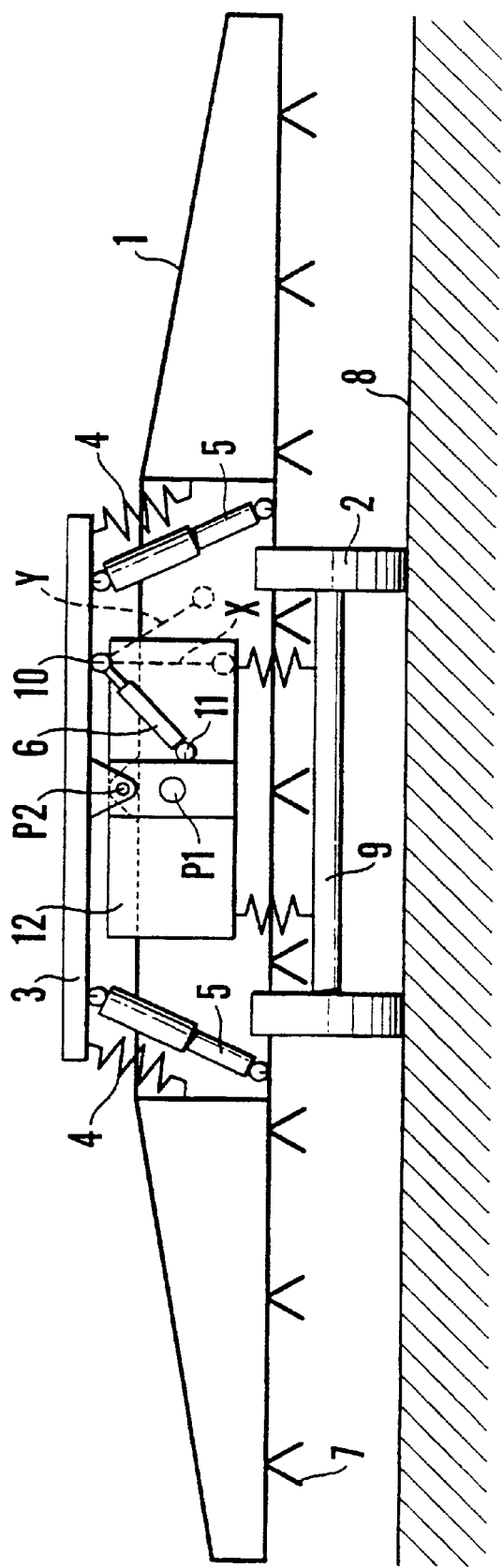
FIG. 3 is a diagram generally similar to that of FIG. 1 and showing that the ground attitude control means may be adjustable.

In the drawings ground attitude control means adapted for use to control the spray boom of an agricultural spray apparatus comprises a carrying vehicle (not shown) having an axle (9) supporting a pair of ground engaging wheels (2). A spray boom framework (1) having spray nozzles (7) is pivotally mounted at (P1) on a carrying frame (12) which is mounted on the vehicle, and a levelling bar (3) is pivotally mounted at (P2) on the boom (1) at a position generally vertically above pivot (P1) and is joined by a linkage (6) to the carrying frame (12). Thus, as shown, the upper end (10) of the linkage (6) is attached to the levelling bar (3) and the lower end (11) of the linkage is connected to the carrying frame (12). The linkage (6) may be in the form of an hydraulic piston and cylinder device whereby the linkage is of adjustable length. The levelling bar (3) and the boom (1) are also connected by springs (4) and shock absorbers (5).

In the geometrical arrangement as shown, said control means operates to isolate the boom (1) from the movements of the carrying frame (12) or at least to moderate the connection between the boom and carrying frame for the purpose of maintaining a set distance between the chemical-applying nozzles (7) of the boom and the surface of the soil or growing crop (8). Thus the geometrical arrangement of the parts of the control means may cause the boom framework (1) to rotate at a lower angular velocity than the carrying frame (12).

The invention may be particularly applicable to an automatic levelling systems, e.g. an hydraulic levelling system since the positioning of the dampers (5) between the boom (1) and levelling member (3) will tend to improve the speed of response of the system.

As shown in FIG. 3, the levelling system may be variable, e.g. by manual adjustment, to move the position of the pivot (11) of the linkage (6) where it is attached to the carrier (12) laterally (i.e. along the boom) between the position shown in full lines, which provides negative compensation, through the generally vertical arrangement of pivots, shown dotted at X, which provides neutral compensation, to the second dotted position shown at Y, which is opposite to the position shown in full lines and which provides positive compensation.

In some conditions, such as a sudden large rotational movement of the tractor, the boom rotating at a lower angular velocity than the tractor is desirable. This is because the boom is less sensitive to the rotational forces transferred from the tractor. This is what is termed negative compensation.

In other conditions, such as a slightly undulating field or rapid, small changes in direction of the tractor, or when the tractor is negotiating a long, sharp bend, a higher angular velocity may be desirable. This is probably because the suspension system reacts quicker to correct a change in rotational attitude (relative to the carrying frame) when the rotational forces come from the boom itself. This is what is termed positive compensation.

It could be that a compromise position may be the optimum under some circumstances and this could be close to or at vertical, i.e. the position X of the linkage. This is what is termed neutral compensation.

The linkage (6) may be made infinitely adjustable between the positions shown in FIG. 3 under the control of a suitable automatic mechanism so that the operator can select the optimum position for a given set of circumstances.

Adjustment of the position of the linkage can also be used to control the damping effort of the shock absorbers or dampers (5) as desired, without the need to adjust the dampers themselves.

INDUSTRIAL APPLICABILITY

The control apparatus described above thus provides a simple mechanism for controlling the attitude of a member, e.g. the spray boom of an agricultural sprayer.

What is claimed is:

1. Ground attitude control apparatus for maintaining a constant boom attitude when travelling over uneven ground, comprising:
    a carrier;
    a boom for supporting crop-spraying equipment, the boom being pivotally mounted on and extending either side of the carrier for movement about a substantially horizontal first pivot axis,
    a levelling member pivotally mounted on the boom for movement about a substantially horizontal second pivot axis,
    at least one damper connected between the levelling member and the boom, the at least one damper exerting a damping effort on the boom, and
    a linkage pivotally connected to both the levelling member and the carrier, the linkage being disposed to control the damping effort exerted by the at least one damper to cause the boom to rotate at a desired angular velocity in response to rotation of the carrier.

2. Apparatus according to claim 1, further comprising a spring connected between the boom and the levelling member.

3. Apparatus according to claim 1, wherein the linkage is in the form of a length adjustable member.

4. Apparatus according to claim 3, wherein the linkage is in the form of a hydraulic cylinder.

5. Apparatus according to claim 1, wherein at least one position at which the linkage is pivoted on the levelling member and carrier is adjustable longitudinally of the boom to vary spacing from the first pivot axis and hence the damping effort exerted and the angular velocity of the boom with respect to the carrier.

6. Apparatus according to claim 1, wherein the first and second pivot axes are generally vertically aligned.

7. Apparatus according to claim 1, wherein the boom is an agricultural spray boom having spray nozzles.

8. An agricultural sprayer comprising:
    ground attitude control apparatus for maintaining a constant boom attitude when travelling over uneven ground, comprising:
    a carrier;
    a spray boom supporting crop-spraying equipment, the spray boom being pivotally mounted on and extending either side of the carrier for movement about a substantially horizontal first pivot axis,
    a leveling member pivotally mounted on the spray boom for movement about a substantially horizontal second pivot axis,
    at least one damper connected between the levelling member and the spray boom, the at least one damper exerting a damping effort on the spray boom, and
    a linkage pivotally connected between the levelling member and the carrier, the linkage being disposed to control the damping effort exerted by the at least one damper to cause the spray boom to rotate at a desired angular velocity in response to rotation of the carrier.

* * * * *